(12) United States Patent
Cooling et al.

(10) Patent No.: US 12,000,343 B1
(45) Date of Patent: Jun. 4, 2024

(54) PRESSURE BALANCING OF ROTATING CONTROL PISTON OF GENERATOR TRANSMISSION

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/295,587

(22) Filed: Apr. 4, 2023

(51) Int. Cl.
| | |
|---|---|
| *F02C 7/32* | (2006.01) |
| *B64D 27/10* | (2006.01) |
| *B64D 35/00* | (2006.01) |
| *F01D 15/10* | (2006.01) |
| *F16D 25/0638* | (2006.01) |

(52) U.S. Cl.
CPC ............... *F02C 7/32* (2013.01); *B64D 27/10* (2013.01); *B64D 35/00* (2013.01); *F01D 15/10* (2013.01); *F16D 25/0638* (2013.01); *F05D 2220/76* (2013.01); *F05D 2260/4023* (2013.01)

(58) Field of Classification Search
CPC ........... F02C 7/32; B64D 27/10; B64D 35/00; F01D 15/10; F16D 25/0638; F05D 2220/76; F05D 2260/4023
See application file for complete search history.

(56) References Cited

U.S. PATENT DOCUMENTS

| | | | | | |
|---|---|---|---|---|---|
| 3,403,763 | A | * | 10/1968 | Black | F16D 25/02 192/56.31 |
| 3,823,802 | A | * | 7/1974 | Winzeler | F16D 25/0638 192/85.25 |
| 7,624,851 | B2 | * | 12/2009 | Seeger | F16D 25/0638 192/70.12 |
| 11,226,014 | B2 | | 1/2022 | Bortoli et al. | |
| 2013/0341934 | A1 | | 12/2013 | Kawanishi | |

\* cited by examiner

*Primary Examiner* — Hoang M Nguyen
(74) *Attorney, Agent, or Firm* — CANTOR COLBURN LLP

(57) ABSTRACT

A clutch assembly includes a clutch pack, and a rotating control piston selectably engageable with the clutch pack via movement of the clutch piston along an axis of rotation of the control piston. The clutch piston includes a piston member engageable with the clutch pack, a cover plate installed into the piston member to define an enclosed volume, and an axially fixed chamber divider positioned in the enclosed volume to divide the enclosed volume into a control pressure chamber and a pressure balancing chamber. Both the control pressure chamber and the pressure balancing chamber are filled with hydraulic fluid, and the control piston is moved between a disengaged position and an engaged position via modulation of hydraulic pressure in the control pressure chamber.

20 Claims, 3 Drawing Sheets

PRESSURE BALANCING OF ROTATING CONTROL PISTON OF GENERATOR TRANSMISSION

BACKGROUND

Exemplary embodiments pertain to the art of transmission systems, e.g. for aircraft low spool turbomachines.

Connecting of accessory components, such as starter/generators to a low spool of a gas turbine engine requires a speed converting transmission to take a relatively wide speed range of rotational energy from the low spool and convert it to a relatively narrow speed range usable by the accessory components. One configuration for accomplishing this utilizes a shifting transmission including clutches that selectably engage different gear ratios.

The transmission includes a rotating hydraulically actuated control piston, which is utilized to engage the gear ratios. In some conditions, the control piston is subject to inadvertently auto-actuating, in which the control piston inadvertently moves causing engagement of one or more clutches of the transmission. In typical configurations, large springs are used to prevent this auto-actuation problem, which adds weight and increases overall size of the machine.

BRIEF DESCRIPTION

In one embodiment, a clutch assembly includes a clutch pack, and a rotating control piston selectably engageable with the clutch pack via movement of the clutch piston along an axis of rotation of the control piston. The clutch piston includes a piston member engageable with the clutch pack, a cover plate installed into the piston member to define an enclosed volume, and an axially fixed chamber divider positioned in the enclosed volume to divide the enclosed volume into a control pressure chamber and a pressure balancing chamber. Both the control pressure chamber and the pressure balancing chamber are filled with hydraulic fluid, and the control piston is moved between a disengaged position and an engaged position via modulation of hydraulic pressure in the control pressure chamber.

Additionally or alternatively, in this or other embodiments the clutch assembly includes a plurality of control pressure orifices fluidly connected to the control pressure chamber through which hydraulic fluid enters and exits the control pressure chamber.

Additionally or alternatively, in this or other embodiments the clutch assembly includes a plurality of pressure balance chamber orifices fluidly connected to the pressure balance chamber through which hydraulic fluid enters and exits the pressure balance chamber.

Additionally or alternatively, in this or other embodiments the clutch assembly includes one or more glide rings positioned between the chamber divider and a radially outer wall of the piston member.

Additionally or alternatively, in this or other embodiments the chamber divider is operably connected to an output shaft.

Additionally or alternatively, in this or other embodiments the chamber divider is formed integral to the output shaft.

Additionally or alternatively, in this or other embodiments the clutch assembly includes a retaining ring to retain the cover plate inside the piston member.

In another embodiment, a speed changing transmission assembly includes an input shaft, an output shaft, and one or more clutch assemblies to selectably engageable with the output shaft. Each clutch assembly includes a clutch pack, and a rotating control piston selectably engageable with the clutch pack via movement of the clutch piston along an axis of rotation of the control piston. The clutch piston includes a piston member engageable with the clutch pack, a cover plate installed into the piston member to define an enclosed volume, and an axially fixed chamber divider located in the enclosed volume to divide the enclosed volume into a control pressure chamber and a pressure balancing chamber. Both the control pressure chamber and the pressure balancing chamber are filled with hydraulic fluid, and the control piston is moved between a disengaged position and an engaged position via modulation of hydraulic pressure in the control pressure chamber.

Additionally or alternatively, in this or other embodiments the clutch assembly includes a plurality of control pressure orifices fluidly connected to the control pressure chamber through which hydraulic fluid enters and exits the control pressure chamber.

Additionally or alternatively, in this or other embodiments the clutch assembly includes a plurality of pressure balance chamber orifices fluidly connected to the pressure balance chamber through which hydraulic fluid enters and exits the pressure balance chamber.

Additionally or alternatively, in this or other embodiments one or more glide rings are located between the chamber divider and a radially outer wall of the piston member.

Additionally or alternatively, in this or other embodiments the chamber divider is operably connected to the output shaft.

Additionally or alternatively, in this or other embodiments the chamber divider is formed integral to the output shaft.

Additionally or alternatively, in this or other embodiments the clutch assembly includes a retaining ring to retain the cover plate inside the piston member.

In yet another embodiment, an aircraft includes a gas turbine engine and one or more accessory components operably connected to the gas turbine engine, and driven by rotational energy diverted from the gas turbine engine. A speed-changing transmission assembly is configured to convert the rotational energy diverted from the gas turbine engine to a speed range usable by the one or more accessory components. The transmission assembly includes an input shaft operably connected to the gas turbine engine, an output shaft operably connected to the one or more accessory components, and one or more clutch assemblies to selectably engageable with the output shaft. Each clutch assembly includes a clutch pack and a rotating control piston selectably engageable with the clutch pack via movement of the clutch piston along an axis of rotation of the control piston. The clutch piston includes a piston member engageable with the clutch pack, a cover plate installed into the piston member to define an enclosed volume, and an axially fixed chamber divider positioned in the enclosed volume to divide the enclosed volume into a control pressure chamber and a pressure balancing chamber. Both the control pressure chamber and the pressure balancing chamber are filled with hydraulic fluid, and the control piston is moved between a disengaged position and an engaged position via modulation of hydraulic pressure in the control pressure chamber.

Additionally or alternatively, in this or other embodiments each clutch assembly includes a plurality of control pressure orifices fluidly connected to the control pressure chamber through which hydraulic fluid enters and exits the control pressure chamber.

Additionally or alternatively, in this or other embodiments each clutch assembly includes a plurality of pressure balance chamber orifices fluidly connected to the pressure balance chamber through which hydraulic fluid enters and exits the pressure balance chamber.

Additionally or alternatively, in this or other embodiments the chamber divider is operably connected to the output shaft.

Additionally or alternatively, in this or other embodiments the input shaft diverts the rotational energy from a low speed spool of the gas turbine engine.

Additionally or alternatively, in this or other embodiments the one or more accessory components includes a generator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
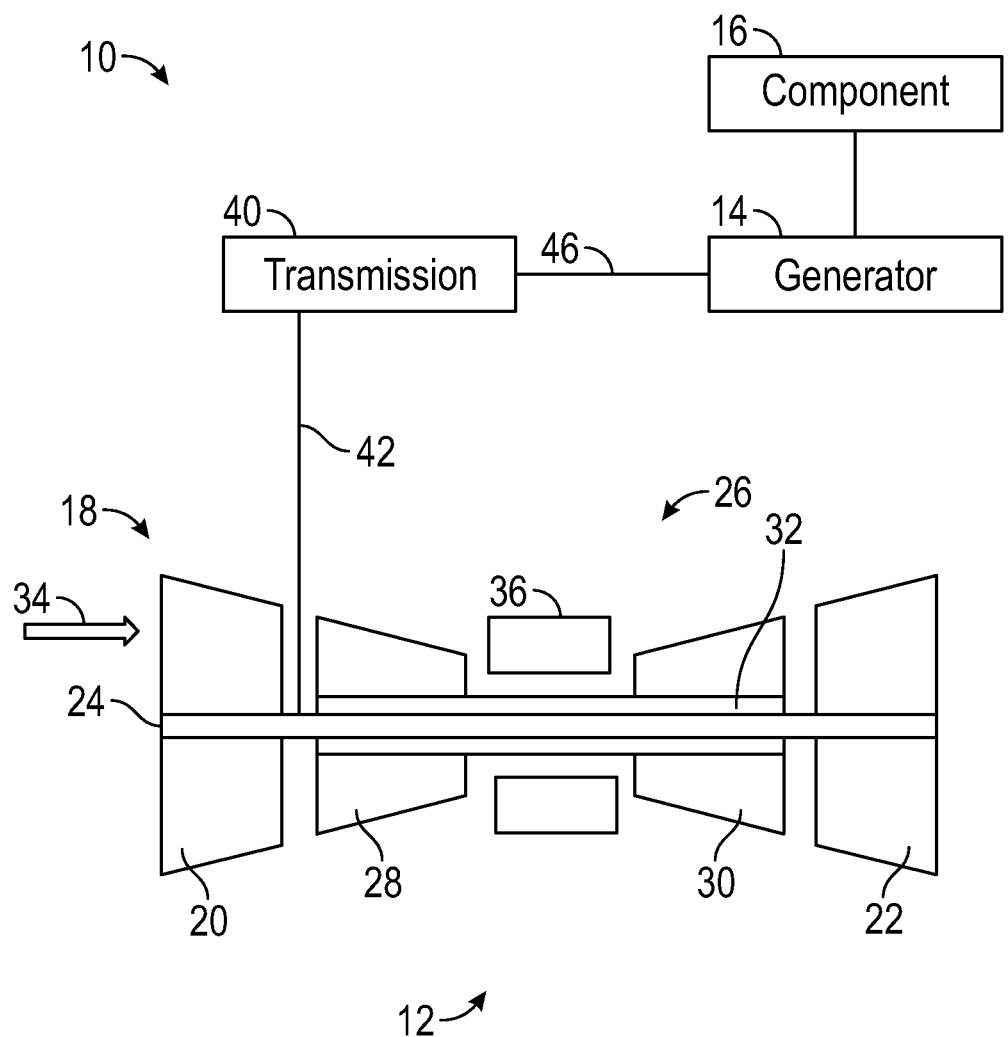
FIG. 1 is a schematic illustration of an embodiment of a vehicle.

Illustrated in FIG. 1 is an embodiment of a vehicle 10, such as an aircraft. The aircraft includes a gas turbine engine 12 and a generator 14 operably connected to the gas turbine engine 12 to generate electrical power from rotational energy drawn from the gas turbine engine 12. The electrical power may be utilized, for example, to power one or more ancillary components 16 of the aircraft which are operably connected to the generator 14.

In some embodiments the gas turbine engine 12 is a multi-spool gas turbine engine 12 having a low spool 18 including a low pressure compressor 20 and a low pressure turbine 22 arranged on a low spool shaft 24, and a high spool 26 including a high pressure compressor 28 and a high pressure turbine 30 arranged on a high spool shaft 32. In operation, airflow 34 enters the gas turbine engine 12 and flow through the low pressure compressor 20 and the high pressure compressor 28 in series to compress the airflow 34. The airflow 34 is mixed with fuel and combusted at a combustor 36, and the combustion products are flowed is series through the high pressure turbine 30 and the low pressure turbine 22, which drives rotation of the high pressure compressor 28 and the low pressure compressor 20, respectively.

Figure 2:
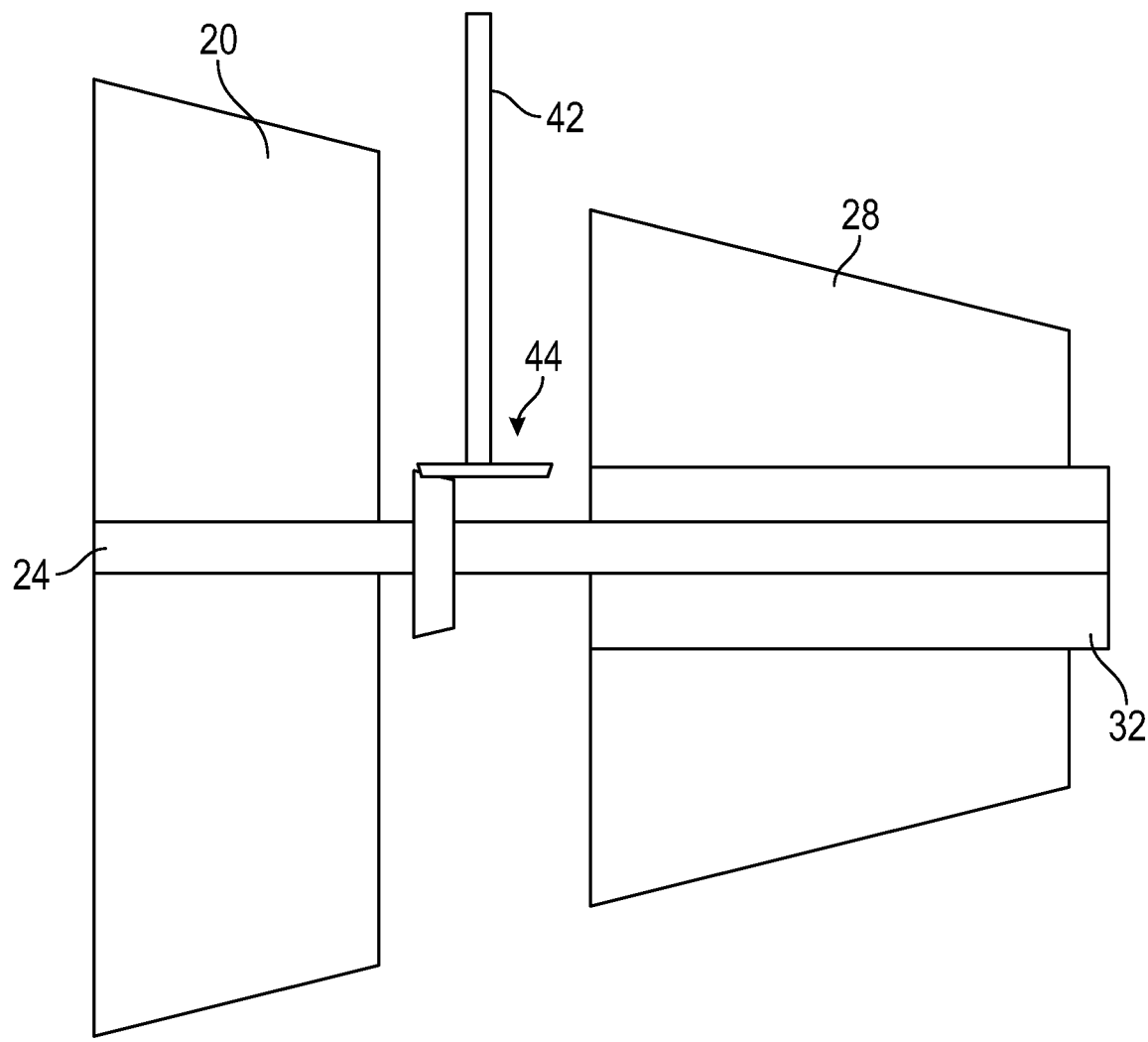
FIG. 2 is a partial illustration of an embodiment of a power takeoff arrangement of a gas turbine engine.

A transmission 40 is interposed between the gas turbine engine 12 and the generator 14 to convert rotational energy output from the gas turbine engine 12 to a speed range usable by the generator 14. The transmission 40 is connected to the gas turbine engine 12 via a power takeoff shaft 42, which transfers rotational energy from the gas turbine engine 12 to the transmission 40. In some embodiments, referring to FIG. 2, the power takeoff shaft 42 is connected to the low spool shaft 24 via a takeoff gear arrangement 44. Referring again to FIG. 1, the transmission 40 includes an output shaft 46 that transfers rotational energy from the transmission 40 to the generator 14.

Figure 3:
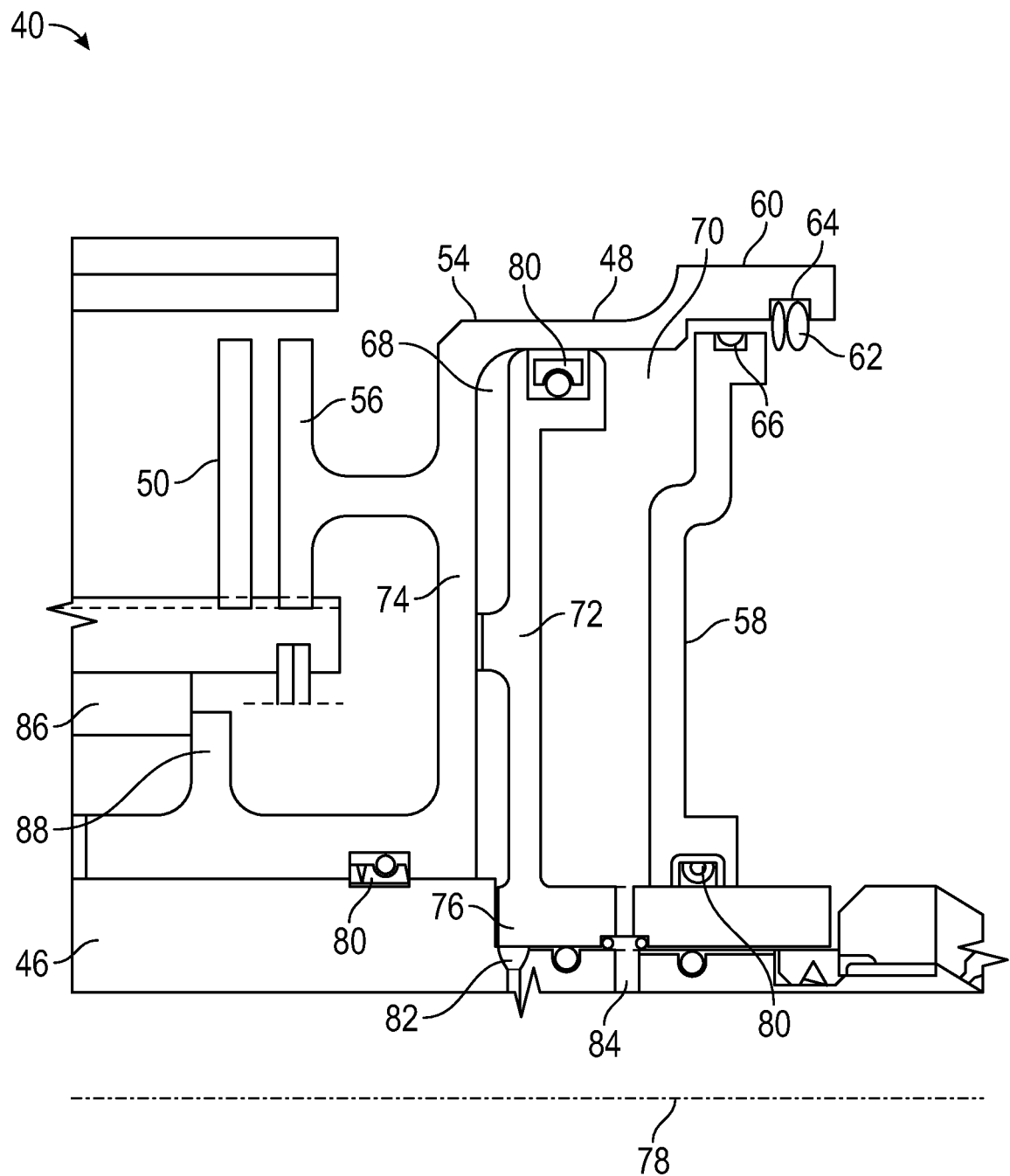
FIG. 3 is a partial cross-sectional view of an embodiment of a transmission.

Illustrated in FIG. 3 is a partial cross-sectional view of the transmission 40. The transmission 40 includes a control piston 48 movable along the output shaft 46 to selectably engage a clutch pack 50, which results in selection of a gear ratio to output a selected rotational speed along the output shaft 46 to the generator 14. The position of the control piston 48 along the output shaft 46 is controlled by fluid pressure in a control pressure chamber. The control piston 48 includes a piston member 54, and has a piston arm 56 engageable with the clutch pack 50. The control piston 48 further includes a backing plate 58 installed to the piston member 54 and also movable along the output shaft 46, which defines an enclosed volume between the piston member 54, the output shaft 46 and the backing plate 58. In some embodiments, the piston member 54 includes a radially-extending piston outer wall 60, with the backing plate 58 installed to the piston member 54 radially inboard of the piston outer wall 60. The backing plate 58 may be retained to the piston member 54 by one or more retaining rings 62 installed into complementary ring slots 64 in the piston outer wall 60. It is to be appreciated that such a retaining mechanism is merely exemplary, and that other retaining mechanisms may be utilized to secure the backing plate 58 to the piston member 54. In some embodiments, one or more seals, such as O-ring seals 66 are positioned between the backing plate 58 and the piston outer wall 60 to prevent leakage of fluid from the enclosed volume.

The enclosed volume is separated into a control pressure chamber 68 and a pressure balancing chamber 70 by a chamber divider 72 positioned axially between a piston axial wall 74 and the backing plate 58. The chamber divider 72 is axially fixed relative to the output shaft 46, and in some embodiments is formed integral to the output shaft 46 as a flange extending radially outwardly from a shaft body 76 of the output shaft 46. In such an arrangement, the control piston 48 moves along a shaft axis 78 direction relative to the chamber divider 72 depending on the fluid pressure in each of the control pressure chamber 68 and the pressure balancing chamber 70. In some embodiments, the arrangement includes glide rings 80 at the interfaces of the piston member 54 to the output shaft 46, the piston member 54 to chamber divider 72 and/or the backing plate 58 to the chamber divider 72. The glide rings 80 are seals which allow for relative axial movement of the components while maintaining a seal to prevent leakage.

To modulate the position of the control piston 48 relative to the clutch pack 50 between a disengaged position illustrated in FIG. 3, and an engaged position, the fluid pressure in the control pressure chamber 68 is varied. To move the control piston 48 to the engaged position, the fluid pressure in the control pressure chamber 68 is increased to urge the control piston 48 into engagement with the clutch pack 50. In some conditions, such as high speed rotation, the control piston 48 must be prevented from auto-actuating due to excess pressure in the control pressure chamber 68 from the rotation. To counteract this tendency, both the control pressure chamber 68 and the pressure balancing chamber 70 are filled with fluid, with the fluid pressure in the control pressure chamber 68 modulated via a plurality of control pressure orifices 82 through which fluid enters and exits the control pressure chamber 68. Similarly, the fluid pressure in the pressure balancing chamber 70 is modulated via a plurality of pressure balancing orifices 84 through which fluid enters and exits the pressure balancing chamber 70.

Because both the control pressure chamber 68 and the pressure balancing chamber 70 are completely filled or flooded with fluid, and the chambers spin at the same speed and are at the same temperature, they exert equal and opposite forces on the control piston 48 due to rotating oil pressure. The net force on the control piston 48 is only due to pressure added to or removed from the control pressure chamber 68 to effect movement of the control piston 48 between the disengaged position and the engaged position. This relatively small difference on pressures between the two chambers reduces the incidence of unintentional or auto engagement of the control piston 48 with the clutch pack 50 due to the rotating fluid forces. In operating conditions where no control pressure is applied, a return spring 86 acts on a control piston flange 88 to urge the control piston 48 toward the disengaged position.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A clutch assembly, comprising:
a clutch pack;
a rotating control piston selectably engageable with the clutch pack via movement of the control piston along an axis of rotation of the control piston, the control piston including:
a piston member engageable with the clutch pack;
a cover plate installed into the piston member to define an enclosed volume;
an axially fixed chamber divider disposed in the enclosed volume to divide the enclosed volume into a control pressure chamber and a pressure balancing chamber;
wherein both the control pressure chamber and the pressure balancing chamber are filled with hydraulic fluid; and
wherein the control piston is moved between a disengaged position and an engaged position via modulation of hydraulic pressure in the control pressure chamber; and
a plurality of control pressure orifices fluidly connected to the control pressure chamber through which hydraulic fluid enters and exits the control pressure chamber.

2. The clutch assembly of claim 1, further comprising a plurality of pressure balance chamber orifices fluidly connected to the pressure balance chamber through which hydraulic fluid enters and exits the pressure balance chamber.

3. The clutch assembly of claim 1, further comprising one or more glide rings between the chamber divider and a radially outer wall of the piston member.

4. The clutch assembly of claim 1, wherein the chamber divider is operably connected to an output shaft.

5. The clutch assembly of claim 4, wherein the chamber divider is formed integral to the output shaft.

6. The clutch assembly of claim 1, further comprising a retaining ring to retain the cover plate inside the piston member.

7. A speed changing transmission assembly, comprising:
an input shaft:
an output shaft; and
one or more clutch assemblies to selectably engageable with the output shaft, each clutch assembly including:
a clutch pack;
a rotating control piston selectably engageable with the clutch pack via movement of the control piston along an axis of rotation of the control piston, the control piston including:
a piston member engageable with the clutch pack;
a cover plate installed into the piston member to define an enclosed volume;
an axially fixed chamber divider disposed in the enclosed volume to divide the enclosed volume into a control pressure chamber and a pressure balancing chamber;
wherein both the control pressure chamber and the pressure balancing chamber are filled with hydraulic fluid; and
wherein the control piston is moved between a disengaged position and an engaged position via modulation of hydraulic pressure in the control pressure chamber; and
wherein the control pressure chamber and the pressure balancing chamber are configured to exert equal and opposite forces on the rotating control piston due to balancing of centripetal forces attributable to the rotation of each hydraulic fluid-filled chamber.

8. The transmission assembly of claim 7, further comprising a plurality of control pressure orifices fluidly connected to the control pressure chamber through which hydraulic fluid enters and exits the control pressure chamber.

9. The transmission assembly of claim 7, further comprising a plurality of pressure balance chamber orifices fluidly connected to the pressure balance chamber through which hydraulic fluid enters and exits the pressure balance chamber.

10. The transmission assembly of claim 7, further comprising one or more glide rings disposed between the chamber divider and a radially outer wall of the piston member.

11. The transmission assembly of claim 7, wherein the chamber divider is operably connected to the output shaft.

12. The transmission assembly of claim 11, wherein the chamber divider is formed integral to the output shaft.

13. The transmission assembly of claim 7, further comprising a retaining ring to retain the cover plate inside the piston member.

14. An aircraft, comprising:
a gas turbine engine;
one or more accessory components operably connected to the gas turbine engine, and driven by rotational energy diverted from the gas turbine engine;
a speed-changing transmission assembly configured to convert the rotational energy diverted from the gas turbine engine to a speed range usable by the one or more accessory components, the transmission assembly including:
   an input shaft operably connected to the gas turbine engine:
   an output shaft operably connected to the one or more accessory components; and
   one or more clutch assemblies to selectably engageable with the output shaft, each clutch assembly including:
      a clutch pack;
      a rotating control piston selectably engageable with the clutch pack via movement of the control piston along an axis of rotation of the control piston, the control piston including:
         a piston member engageable with the clutch pack;
         a cover plate installed into the piston member to define an enclosed volume;
         an axially fixed chamber divider disposed in the enclosed volume to divide the enclosed volume into a control pressure chamber and a pressure balancing chamber;
         wherein both the control pressure chamber and the pressure balancing chamber are filled with hydraulic fluid; and
         wherein the control piston is moved between a disengaged position and an engaged position via modulation of hydraulic pressure in the control pressure chamber; and
      a plurality of control pressure orifices fluidly connected to the control pressure chamber through which hydraulic fluid enters and exits the control pressure chamber.

15. The aircraft of claim 14, further comprising a plurality of pressure balance chamber orifices fluidly connected to the pressure balance chamber through which hydraulic fluid enters and exits the pressure balance chamber.

16. The aircraft of claim 14, wherein the chamber divider is operably connected to the output shaft.

17. The aircraft of claim 14, wherein the input shaft diverts the rotational energy from a low speed spool of the gas turbine engine.

18. The aircraft of claim 14, wherein the one or more accessory components includes a generator.

19. The clutch assembly of claim 2, wherein a hydraulic fluid pressure in the pressure balancing chamber is modulated via the plurality of pressure balancing orifices.

20. The transmission assembly of claim 9, wherein a hydraulic fluid pressure in the pressure balancing chamber is modulated via the plurality of pressure balancing orifices.

* * * * *